W. L. DILLON.
FENCE CLAMP.
APPLICATION FILED OCT. 27, 1909.
1,107,159.
Patented Aug. 11, 1914.
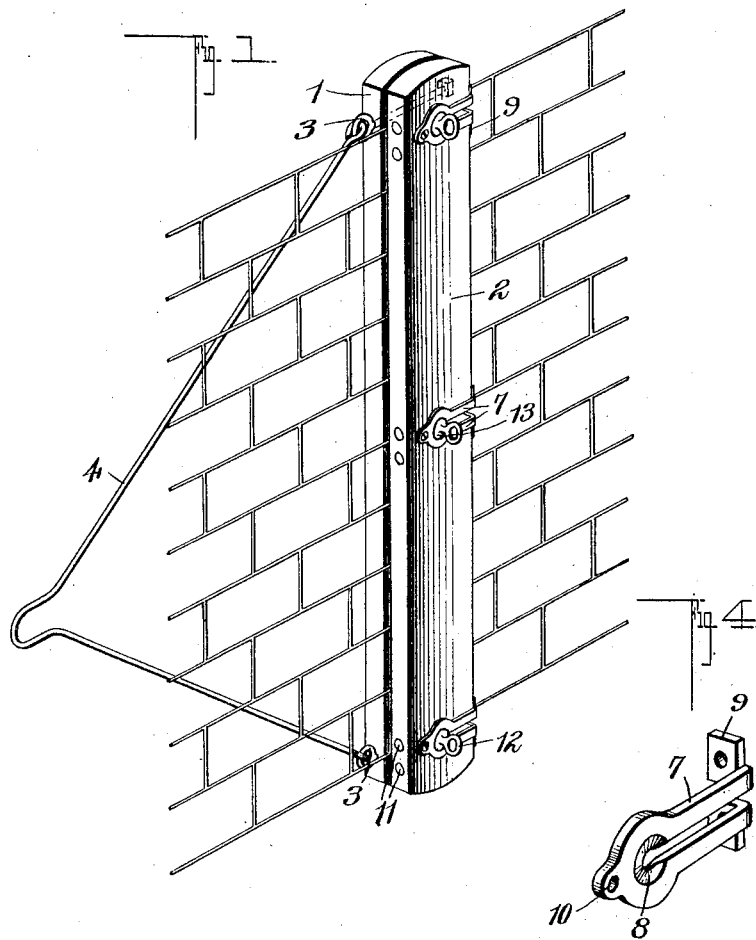
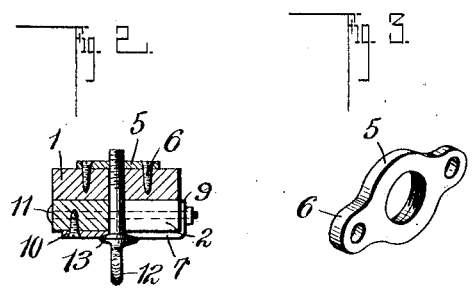
Witnesses
Philip H. Burch
E. B. McBath
Inventor
W. L. Dillon,
By Meara & Brock
Attorneys

UNITED STATES PATENT OFFICE.

WILLIAM L. DILLON, OF COUNCIL BLUFFS, IOWA.

FENCE-CLAMP.

1,107,159.

Specification of Letters Patent. Patented Aug. 11, 1914.

Application filed October 27, 1909. Serial No. 524,900.

*To all whom it may concern:*

Be it known that I, WILLIAM L. DILLON, a citizen of the United States, residing at Council Bluffs, in the county of Pottawattamie and State of Iowa, have invented a new and useful Improvement in Fence-Clamps, of which the following is a specification.

This invention relates to a clamp for wire fences, the object of the invention being to quickly connect the fence to any suitable stretching device, without the necessity of removing nuts or bolts from the clamping plates.

I am aware of the fact that it is common to clamp a wire fence between two flat boards, bolts passing through the boards and also through the meshes of the fence, the boards being held in position by nuts arranged upon the ends of the bolts. In order to shift the position of the clamping boards it was necessary to remove the nuts and withdraw the bolts. As the work of stretching fences is usually carried on over a large area usually covered with grass and weeds considerable time was lost in hunting missing nuts and bolts which had fallen or been placed upon the ground, such time being added to the time and labor required to remove and replace the bolts and nuts. I avoid this extra labor and loss of time by means of clamping plates constructed as hereinafter described and as shown in the accompanying drawings, in which, Figure 1 is a perspective view showing the device in position for use. Fig. 2 is a transverse section through the clamping plates, the wire fence being omitted. Figs. 3 and 4 are perspective detail views of small parts of the device.

In these drawings, 1 and 2 represent flat clamping boards between which the wire fence is to be held, said boards having a length somewhat greater than the height of the fence to be clamped. Extending transversely through the board 1, and parallel to the sides of the board are eye bolts 3 arranged respectively adjacent the top and bottom of the board and to said bolts is connected a bail 4, to which bail is to be connected in any desired manner any form of stretcher to be used. Upon the outer face of the board 1 and at suitable intervals I place metal rings 5 interiorly threaded and provided with perforated lugs 6 through which may be passed nails or screws for the purpose of holding said rings upon the board. The board is also perforated in alinement with the rings 5. The board 2 is provided with transverse slots, the inner ends of said slots being adapted to register with the perforations of the board 1 and to strengthen the board at these slots I secure thereupon slotted plate 7, said plates having a countersunk head portion 8 at the inner end of the slot, and being provided with right-angled perforated flanges 9 at the opposite end. The plates 7 are held upon the board 2 by screws which pass through a suitable opening 10 in the countersunk head, and also by means of suitable bolts 11 which pass through the board parallel to its sides and through the flanges 9. Suitable eye bolts 12 have threaded end portions adapted to engage the threads of the rings 5, and these bolts are also provided with shoulders 13 adapted to seat in the countersunk head 8.

In use the board 1 which carries the bolts 12 is placed in position transverse to the fence, the bolts 12 extending through the meshes of the fence. The board 2 is then brought into position upon the opposite side of the fence and is slipped transversely with respect to the board 1, the slots in the board 2 receiving the bolts 12. The bolts 12 are then turned bringing the shoulder 13 into close engagement with the countersunk seats of the heads 8 thus firmly clamping the two boards together with the fence between them.

To remove the clamp from the fence it is only necessary to loosen the bolts 12, when the board 2 can be slipped from engagement with said bolts, and the board 1 can then be removed the bolts passing freely through the meshes of the fence. It is not necessary to remove any nuts, or to disengage the bolts from the board 1 by which they are normally carried.

What I claim is:—

A fence clamp comprising a pair of elongated members, one of said members being provided with slots leading in from the longitudinal edge thereof, plates mounted on the side of the slotted member and having opposite side portions which extend along the opposite edge of the slots, said plates having end portions which are disposed against the edge of the said slotted member at the opposite sides of the slots, bolts passing transversely through the end portions of said plates which are at the edge of the member and also passing transversely
5 through the said member at the opposite sides of the slots, and clamping bolts adapted to enter the slots and the spaces between the opposite side portions of the plates and engageable with the member other than the said slotted member.

WILLIAM L. DILLON.

Witnesses:
C. W. FOWLER,
E. B. McBATH.

Copies of this patent may be obtained for five cents each, by addressing the "Commissioner of Patents, Washington, D. C."